US006451888B1

(12) United States Patent
Mahood

(10) Patent No.: US 6,451,888 B1
(45) Date of Patent: Sep. 17, 2002

(54) SOLID STABILIZER COMPOSITION WITH IMPROVED HYDROLYTIC STABILITY

(75) Inventor: James A. Mahood, Parkersburgh, WV (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 08/252,511

(22) Filed: Jun. 1, 1994

(51) Int. Cl.$^7$ .............................. C08K 5/34; C08K 5/49; C08K 5/53; C08K 15/32

(52) U.S. Cl. ................. 524/101; 524/120; 524/126; 524/195; 252/400.24; 252/403

(58) Field of Search ................ 524/101, 120, 524/126; 252/400.24, 403

(56) References Cited

U.S. PATENT DOCUMENTS

| | | | |
|---|---|---|---|
| 4,025,486 A | 5/1977 | Gilles | 524/101 |
| 4,444,929 A | 4/1984 | Chaser | 524/101 |
| 4,957,956 A | 9/1990 | Neri et al. | 524/120 |

FOREIGN PATENT DOCUMENTS

| | | |
|---|---|---|
| EP | A-0281189 | 9/1988 |
| EP | A-0565184 | 10/1993 |
| EP | A-0635540 | 1/1995 |

*Primary Examiner*—Kriellion A. Sanders

(57) ABSTRACT

A phosphite stabilizer composition is provided which exhibits enhanced hydrolytic stability. The stabilizer composition preferably contains from 10 to 90 percent by weight of a phosphorous compound selected from phosphites and phosphonites, and preferably contains from 10 to 90 percent by weight of a hindered phenolic isocyanate. The stabilizer composition exhibits enhanced hydrolytic stability, and is preferably in the form of powders or flakes. The stabilizer composition is useful as an additive to polymeric resins as an antioxidant stabilizer.

12 Claims, No Drawings

SOLID STABILIZER COMPOSITION WITH IMPROVED HYDROLYTIC STABILITY

BACKGROUND OF THE INVENTION

1. Field of the Invention

The present invention relates to solid phosphate stabilizer compositions, and more particularly relates to solid phosphite stabilizer compositions exhibiting enhanced hydrolytic stability.

2. Description of the Related Art

Hydroxyphenyl alkyleneyl isocyanurates have been utilized in conjunction with the phosphites, specifically pentaerythritol phosphites, for the stabilization of polyolefins, see Gilles, U.S. Pat. No. 4,025,486, issued May 24, 1977. The Gilles reference while teaching enhanced stability for the polyolefin materials by utilizing in combination isocyanurate compounds and phosphite compounds therein, in respective amounts of 0.01 part to 5 parts by weight of hydroxyphenylalkyleneyl isocyanurate compound per 100 parts by weight of organic material, and the pentaerythritol phosphite at 0.01 part to 5 parts by weight per 100 parts by weight of organic material. In other words, while Gilles, U.S. Pat. No. 4,025,486, addresses the stability issues associated with polyolefin compositions, Gilles neither shows nor suggests how to address the hydrolysis problems associated with the phosphite by preparing a stabilizer composition containing relatively large amounts of the phosphite and the hindered phenolic isocyanurate.

The susceptibility of organic phosphites to hydrolysis, is known. Prior attempts to enhance the hydrolysis resistance of various phosphites by utilizing a continuous phase of amorphous tetrakis-(3-(3,5-di-tert-butyl-4-hydroxyphenol)-propionyloxymethyl) methane as set out in Neri et al., U.S. Pat. No. 4,957,956, issued Sep. 18, 1990, which is incorporated herein by reference, have exhibited some enhancement in hydrolytic stability, but generally blends of such material can experience hydrolytic instability after extended exposure to humidity at ambient temperature. Additionally, there is a desire to provide hindered phenolic/phosphite blends which optionally can utilize a phosphite having a melting point either within or outside of the melting point specified in Neri et al., U.S. Pat. No. 4,957,956.

SUMMARY OF THE INVENTION

The present invention involves a solid phosphite stabilizer composition with improved hydrolytic stability, which comprises a melt blend of an organic phosphite and a hindered phenolic isocyanurate, more preferably comprises a blend of a phosphite and tris(3,5-di-tert-butyl-4-hydroxybenzyl) isocyanurate. The blends have surprisingly and unexpectedly exhibited superior hydrolytic stability compared to melt blend compositions comprising phosphite and tetrakis(3-(3, 5-di-tert-butyl-4-hydroxy phenol)-propionyloxymethyl) methane. The solid stabilizer compositions are useful as additives for stabilizing polymeric compositions.

DETAILED DESCRIPTION OF THE INVENTION

The hydroxyphenylalkyleneyl isocyanurate compounds have the formula

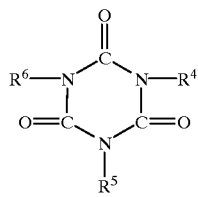

wherein $R^4$ is a hydroxyphenylalkyleneyl radical of the formula

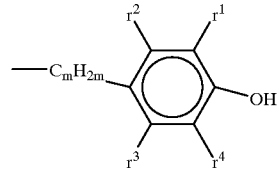

where m is 1 to 4, $r^1$ is an alkyl radical having 1 to 18 carbon atoms and is positioned immediately adjacent to the hydroxy group on the ring; $r^2$, $r^3$ and $r^4$ are hydrogen or an alkyl radical containing 1 to 18 carbon atoms, and $R^5$ and $R^6$ are hydrogen, an alkyl radical containing 1 to 18 carbon atoms, or are the same as $R^4$. A more preferred compound is when $R^5$ and $R^6$ are equal to $R^4$, i.e., all the $R^4$, $R^5$ and $R^6$ groups are hydroxyphenylalkyleneyl radicals, and $r^1$ is a t-alkyl radical containing from 4 to about 12 carbon atoms, $r^2$ is an alkyl radical containing 1 to about 12 carbon atoms, $r^3$ and $r^4$ are hydrogen, and m=1.

Even more preferred are the symmetrical tris(3,5-di-tert-alkyl-4-hydroxybenzyl) isocyanurates of the formula

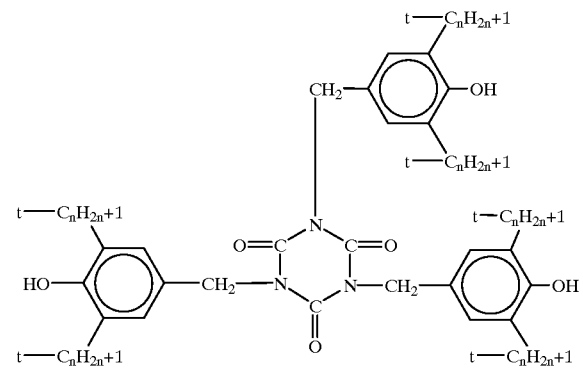

where n is 4 to 8.

Examples of the 4-hydroxybenzyl isocyanurate compounds are: tris-(3-methyl-4-hydroxybenzyl)isocyanurate, tris-(3-t-butyl-4-hydroxybenzyl)isocyanurate, tris-(3-t-amyl-4-hydroxybenzyl)isocyanurate, tris-(3-cetyl-4-hydroxybenzyl)-isocyanurate, tris-(3,5-dimethyl-4-hydroxybenzyl)isocyanurate, tris-(3,diisopropyl-4-hydroxybenzyl)isocyanurate, tris-(3-methyl-5-isopropyl-4-hydroxybenzyl)isocyanurate, tris-(3-hexyl-4-hydroxybenzyl)isocyanurate, tris-(3,5-di-t-butyl-4-hydroxybenzyl)isocyanurate, tris-(3-t-butyl-5-t-amyl-4-hydroxy-benzyl)isocyanurate, tris-(3,5-di-t-amyl-4-hydroxybenzyl)-isocyanurate, tris-(3,5-di-(1-methyl-1-ethylpropyl)-4-hydroxy-benzyl)isocyanurate, tris-(3,5-di-(1,1,2,2-tetramethylpropyl)-4-hydroxybenzyl) isocyanurate, tris-(3,5-di-(1-di-methylpentyl)-4-hydroxybenzyl)-isocyanurate, bis-(3-methyl-4-hydroxybenzyl)- isocyanurate, bis-(3-t-butyl-4-hydroxybenzyl)isocyanurate, bis-(3,5-dimethyl-4-hydroxybenzyl)isocyanurate, bis-(3,5-di-t-butyl-4-hydroxybenzyl)-isocyanurate, (3-methyl-4-hydroxy-benzyl)isocyanurate (3-t-butyl-4-hydroxybenzyl) isocyanurate, (3,5-dimethyl-4-hydroxbenzyl)isocyanurate, (3,5-di-t-butyl-4-hydroxybenzyl)isocyanurate, and the like. Reference is made to U.S. Pat. No. 3,531,483 which discloses isocyanurate compounds encompassed by this invention. The patent shows the preparation of these compounds and their utility as stabilizers, and is hereby incorporated by reference. By utilizing a high melting temperature hydroxyphenyl alkyleneyl isocyanurate, suitable solid particles may be obtained even when a viscous liquid phosphite is used as the organic phosphite of the present compositions. In other words, phosphites (such as itrisnonylphenyl phosphite) having melting temperatures below 25° may be successfully utilized in the compositions of the present invention to provide free flowing solid particles at room temperature.

Considerable phosphites include those elected from the general formula

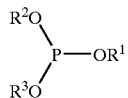

wherein $R^1$, $R^2$ and $R^3$ represent either equal or different hydrocarbyl radicals, which can be either alkyl, cycloalkyl, aryl, alkaryl or aralkyl radicals; an either amorphous or crystalline organic phosphite, in the form of particles with a particle size comprised within the range of from 30/μm to 2 mm, with said organic phosphite having a melting point higher than approximately 100° C., and being selected from those definable by the general formulae:

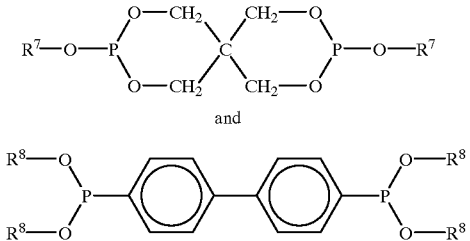

and wherein the $R^7$ and $R^8$ radicals independently represent either alkyl, cycloalkyl, aryl, alkaryl or aralkyl radicals.

The phosphite is preferably a pentaerythritol phosphite which may be selected from the group consisting of (a) compounds of the formula

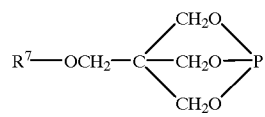

wherein $R^7$ is an aliphatic radical containing 1 to about 20 carbon atoms, a cycloalkyl ring of 5 to about 8 carbon atoms, or an aryl, alkaryl, or aralkyl group of 6 to about 14 carbon atoms, and (b) compounds of the formula

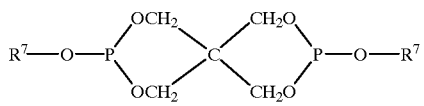

wherein $R^7$ is defined as above. Illustrative of these compounds are those where when $R^7$ is an aliphatic radical; $R^7$ can be (a) an alkyl radical such as methyl, ethyl, isopropyl, n-butyl, n-boxyl, 2-ethylhexyl, n-dodecyl, n-tetradecyl, n-octadecyl, and the like, (b) an alkoxyalkyl radical of 2 to about 20 carbon atoms such as methoxyethyl, ethoxyethyl, ethoxypropyl, and the like, and (c) alkoxy carboalkyl radicals of 2 to about 20 carbon atoms such as methoxycarboethyl, propyloxycarboethyl, decyloxycarboethyl, and the like. When $R^7$ is a cycloalkyl ring, illustrations of $R^7$ include cyclopentyl, cyclohexyl, cyclooctyl, and the like. When $R^7$ is an aryl group, phenyl and naphthyl are examples thereof. The aryl group can be halogenated as in a bromophenyl group. Lastly, when $R^7$ is alkaryl of 7 to about 14 carbon atoms; i.e., an alkyl-substituted phenyl or naphthyl group, illustrations thereof are methylphenyl, t-butyl-phenyl, nonylphenyl, and the like; and when $R^7$ is aralkyl of 7 to about 14 carbon atoms; i.e., an aryl-substituted alkyl group, benzyl and phenylethyl are examples thereof. The alkaryl or aralkyl group can be halogenated as in a 2-chloroethylphenyl group.

Examples of the defined pentaerythritol phosphites are dimethylpentaerythritol diphosphite, diethylpentaerythritol diphosphite, didodecylpentaerytltritol diphosphite, dioctadecylpentaerythritol diphosphite, diphenylpentaerylthritol diphosphite, ditolylpentaerythritol diphosphite, di-p-chlorophenylpentaerythritol diphosphite, dibenzylpentaerythritol diphosphite, and the like. U.S. Pat. Nos. 2,847,443; 2,961,454; 3,000,850; 3,205,250; and 3,737,485 disclose further examples of the defined compounds.

More preferably, the $R^7$ groups are alkyl radicals of 1 to 20 carbon atoms, cyclohexyl, phenyl, or benzyl. Most preferably, $R^7$ is a higher-alkyl group containing about 6 to about 20 carbon atoms such as n-hexyl, n-octyl, 2-ethylhexyl, n-decyl, n-tetradecyl, n-octadecyl, and the like.

The stabilizer composition of the present invention comprises from 10 percent by weight to 90 percent by weight of the phosphite based on the total weight of the stabilizer composition, more preferably from 30 to 70 percent by weight thereof, and most preferably from 40 to 60 percent by weight thereof. The hindered phenolic isocyanurate is preferably present at a level of from 10 to 90 percent by weight based on the total weight of the stabilizer composition, and more preferably present at a level of from 30 to 70 percent by weight thereof, and most preferably present at a level of from 40 to 60 percent by weight thereof. The stabilizer composition is preferably in the form of particles, such as powders and flakes. In the case of powders preferably has a size selected from between 10 μm to 2 mm. The stabilizer composition preferably contains less than 10 percent by weight of other materials such as polymeric materials and other organic materials such as waxes, synthetic and petroleum dried lubricating oils and greases; animal oils such as for example fat, tallow, lard, cod liver oil, sperm oil; vegetable oil such as caster, linseed, peanut, cod seed, and the like; fuel oil, diesel oil, gasoline, and the like. In other words, the stabilizer composition, is preferably substantially free of other materials, in other words, containing less than 1 percent of other organic materials, and more preferably is free of other organic materials. Optionally, the stabilizer composition ma contain an amount of an amine, such as trisisopropanolamine in order to further provide the phosphite with hydrolytic stability. The compositions of the present invention are preferably amorphous to ensure homogeneity of the compositions. The present compositions are preferably obtained by melt mixing rather than simple mechanical blending or solution blending, and surprisingly and unexpectedly the compositions made by melt mixing show superior hydrolytic stability over similar compositions made by simple mechanical (dry) or solution blending.

Examples

The following examples illustrate the enhanced hydrolytic stability of the present stabilizer compositions. Examples A, B and C are comparative examples. Examples 1 and 2 illustrate compositions of the present invention. Example A is bis (2-butyl-2-ethyl-1,3-propanediol) 4,4'-thiobis (2-methyl-6-tert-butylphenol) diphosphite. Comparative Example B is a mechanical blend containing 50 percent by weight of the phosphite of Example A and 50 percent by weight of amorphous tetrakis-(3-3,5-di-tert-butyl-4-hydroxy phenol)-propionyloxymethyl)-methane. Example 1 of the present invention comprises 50 percent by weight of the phosphite of Example A and 50% by weight of tris(3,5-di-tert-butyl-4-hydroxybenzyl)isocyanate. Comparative Example C is bis(2,4 di-tert-butylphenyl) pentaerythritol di-phosphite. Comparative Example D comprises 50% by weight of the phosphite of comparative Example C and 50% by weight of amorphous tetrakis-(3-3,5-di-tert-butyl-4-hydroxy phenol)-propionyloxymethyl)-methane. Example 2 of the present invention comprises 50% by weight of the phosphite of Example C and 50% by weight of tris (3,5-di-tert-butyl-4-hydroxybenzyl)isocyanate.

It is clear from the above examples that the phosphite stabilizer blend compositions of the present invention as exemplified by Example 1 and Example 2 provide enhanced hydrolytic stability over the phosphite compositions of Example A and Example C, and furthermore the composition of Example 1 clearly sets forth the enhanced hydrolytic stability achieved by the compositions of the present invention over hindered phenolic/phosphite blends such as set out in Example B.

Table 3 illustrates the enhanced resistance to weight gain achieved by melt blending a phosphorous compound and a hindered phenolic isocyanurate compared to dry blending or solvent blending. Also, the surprisingly and unexpectedly superior results are illustrated by a comparison with melt blending a phosphorous compound and a simple hindered phenolic (tetrakis (methylene 3-(3,5-di-t-butyl-4-hydroxy phenyl) propionate)methane). The samples of Table 3 were exposed to 75% nominal relative humidity at room temperature and times in hours to 1% weight gain are set out. CEX-E was tetrakis (methylene 3-(3,5-di-t-butyl-4-hydroxyphenyl) propionate; CEX-F was tris(3,5-di-tert-butyl-4-hydroxybenzyl) isocyanurate; CEX-G was bis(2,4-di-tert-butylphenyl) pentaerythritol-di-phosphite. CEX-H was a 1:1 weight ratio dry blend of bis(2,4-di-tert-butylphenyl) pentaerythritol-di-phosphite and tris(3,5-di-tert-butyl-4-hydroxybenzyl)isocyanurate; CEX-I was a 1:1 weight ratio solvent blend of bis (2,4-di-tert-butylphenyl)pentaerythritol-di-phosphite and tris(3,5-di-tert-butyl-4-hydroxybenzyl) isocyanurate; EX-3 was a 1:1 weight ratio melt blend of bis(2,4-di-tert-butylphenyl) pentaerythritol-di-phosphite and tris (3,5-di-tert-butyl-4-hydroxybenzyl)isocyanurate; CEX-5 was a 1:1 weight ratio dry blend of bis (2,4-di-tert-butylphenyl)pentaerythritol-di-phosphite and tetrakis (methylene 3-(3,5-di-t-butyl-4-hydroxyphenyl) propionate; CEX-K was a 1:1 weight ratio solvent blend of bis (2,4-di-tert-butylphenyl)pentaerythritol-di-phosphite and tetrakis (methylene 3-(3,5-di-t-butyl-4-hydroxyphenyl) propionate; CEX-L was a 1:1 weight ratio melt blend of bis (2,4-di-tert-butylphenyl)pentaerythritol-di-phosphite and tetrakis (methylene 3-(3,5-di-t-butyl-4-hydroxyphenyl) propionate.

TABLE 1

| Time (Hours) | CEX-A | CEX-B | EX1 |
|---|---|---|---|
| 0 | 0 | 0 | 0 |
| 96 | 0 | 0.06 | 0.14 |
| 144 | 0.05 | 0.22 | 0.22 |
| 192 | 0.2 | 0.24 | 0.26 |
| 240 | 0.68 | 0.32 | 0.26 |
| 288 | 1.32 | 0.2 | 0.32 |
| 336 | 2.34 | 0.24 | 0.24 |
| 408 | 3.71 | 0.34 | 0.32 |
| 456 | | 0.34 | 0.2 |
| 504 | | 0.64 | 0.38 |
| 552 | | 0.66 | 0.2 |
| 624 | | 1.2 | 0.38 |
| 672 | | 1.88 | 0.26 |
| 720 | | 3.12 | 0.24 |
| 792 | | | 0.38 |
| 864 | | | 0.24 |
| 888 | | | 0.28 |
| 960 | | | 0.38 |
| 1128 | | | 0.28 |
| 1296 | | | 0.34 |
| 1392 | | | 0.4 |
| 1488 | | | 0.4 |
| 1560 | | | 0.46 |
| 1632 | | | 0.48 |
| 1800 | | | 0.42 |
| 1968 | | | 0.54 |
| 2136 | | | 0.68 |

TABLE 2

| Time (Hours) | CEX-C | CEX-D | EX2 |
|---|---|---|---|
| 0 | 0 | 0 | 0 |
| 24 | 0.08 | 0.4 | 0.26 |
| 48 | 0.08 | 0.48 | 0.3 |
| 72 | 0.17 | 0.56 | 0.38 |
| 144 | 0.53 | 1.22 | 0.36 |
| 216 | 1.66 | 3.32 | 0.18 |
| 312 | 4.54 | 7.54 | 0.22 |
| 384 | | | 0.32 |
| 480 | | | 0.36 |
| 576 | | | 0.48 |
| 672 | | | 0.44 |
| 744 | | | 0.72 |
| 816 | | | 0.48 |
| 984 | | | 0.86 |
| 1152 | | | 1.38 |
| 1560 | | | 2.54 |

TABLE 3

| Sample | Hours to 1% weight gain |
|---|---|
| CEX-E | 1320+ |
| CEX-F | 1320+ |
| CEX-G | 222 |
| CEX-H | 230 |
| CEX-I | 141 |
| EX-3 | 1320+ |
| CEX-J | 136 |
| CEX-K | 321 |
| CEX-L | 154 |

What is claimed is:

1. A melt blend stabilizer composition exhibiting enhanced hydrolytic stability comprising:
   (A) a phosphorous compound selected from the group consisting of phosphites and phosphonites, said phosphorous compound being present at a level of from 10 percent by weight to 90 percent by weight based on the total weight of the stabilizer composition,
   (B) a hindered phenolic isocyanurate present at a level of from 10 percent by weight to 90 percent by weight based on the total weight of the composition and, (C) less than about 10 percent by weight additional materials.

2. The stabilizer composition of claim 1 wherein said phosphorous compound is present at a level of from 30 percent by weight to 70 percent by weight based on the total weight of the composition.

3. The stabilizer composition of claim 1 wherein said phosphorous compound is present at a level of from 40 to 60 percent by weight based on the total weight of the composition.

4. The stabilizer composition of claim 1 wherein said stabilizer composition consists essentially of said phosphorous compound and said hindered phenolic isocyanurate.

5. The stabilizer composition of claim 1 wherein said stabilizer composition consists of said phosphorous compound and said hindered phenolic isocyanurate.

6. The stabilizer composition of claim 1 wherein said phosphorous compound is a phosphite represented by the general formula

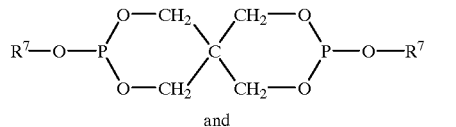

and

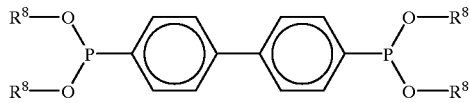

each $R^7$ and $R^8$ radical is independently selected from the group consisting of alkyl, cycloalkyl, aryl, alkaryl or aralkyl radicals.

7. The stabilizer composition of claim 1 wherein said hindered phenolic isocyanurate is represented by the general formula

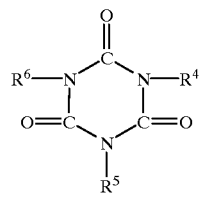

wherein $R^4$ is a hydroxyphenylalkyleneyl radical of the formula

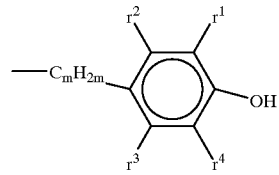

where m is 1 to 4, $r^1$ is an alkyl radical having 1 to 18 carbon atoms and is positioned immediately adjacent to the hydroxy group on the ring; $r^2$, $r^3$ and $r^4$ are hydrogen or an alkyl radical containing 1 to 18 carbon atoms, and $R^5$ and $R^6$ are hydrogen, an alkyl radical containing 1 to 18 carbon atoms, or are the same as $R^4$.

8. The composition of claim 1 wherein said phosphorous compound is 2,4,6-tri-tert-butylphenyl 2-butyl-2-ethyl-1,3-propanediol phosphite.

9. The composition of claim 1 wherein said phosphorous compound is bis(2-butyl-2-ethyl-1,3-propanediol) 4,4'-thiobis(2-methyl-6-tert-butylphenol) diphosphite.

10. The composition of claim 1 wherein said composition is in the form of a powder having number average particle size selected from between 10 nanometers and 2 millimeters.

11. The stabilizer composition of claim 1 wherein said composition is in the form of flakes.

12. A method for making a stabilizer composition exhibiting enhanced hydrolytic stability, said method comprising:
   (a) melt blending a phosphorous compound and a hindered phenolic isocyanurate; said composition comprising from 10 to 90 weight percent of said phosphorous compound and from 10 to 90 weight percent of said hindered phenolic isocyanurate based on the total weight of the composition.

* * * * *